(12) United States Patent
Block et al.

(10) Patent No.: US 10,949,373 B2
(45) Date of Patent: Mar. 16, 2021

(54) AVIONICS SYSTEM, ARCHITECTURE, AND METHOD

(71) Applicant: Sandel Avionics, Inc., Vista, CA (US)

(72) Inventors: Gerald J. Block, Vista, CA (US); Delmar M. Fadden, Preston, WA (US); John Morton, III, Canyon Lake, CA (US)

(73) Assignee: SANDEL AVIONICS INC., Vista, CA (US)

( * ) Notice: Subject to any disclaimer, the term of this patent is extended or adjusted under 35 U.S.C. 154(b) by 0 days.

(21) Appl. No.: 15/351,412

(22) Filed: Nov. 14, 2016

(65) Prior Publication Data

US 2017/0139869 A1  May 18, 2017

Related U.S. Application Data

(60) Provisional application No. 62/255,010, filed on Nov. 13, 2015, provisional application No. 62/254,983, filed on Nov. 13, 2015, provisional application No. 62/254,959, filed on Nov. 13, 2015.

(51) Int. Cl.
| | |
|---|---|
| *G06F 13/40* | (2006.01) |
| *G06F 11/10* | (2006.01) |
| *G06F 13/42* | (2006.01) |
| *G08G 5/02* | (2006.01) |

(52) U.S. Cl.
CPC ...... *G06F 13/4068* (2013.01); *G06F 11/1004* (2013.01); *G06F 13/4204* (2013.01); *G08G 5/025* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,298,320 | B1 * | 10/2001 | Buckmaster | .......... G06F 11/261 703/19 |
| 6,889,159 | B2 * | 5/2005 | Klotz | .................... G06F 11/263 702/120 |
| 2006/0010438 | A1 | 1/2006 | Brady et al. | |

(Continued)

FOREIGN PATENT DOCUMENTS

EP          2325749          5/2011

OTHER PUBLICATIONS

Rushby, John. Partitioning in Avionics Architectures: Requirements, Mechanisms, and Assurance, Report No. DOT/FAA/AR-99/58 [online], Mar. 2000 [retrieved on Nov. 9, 2018]. Retrieved from the Internet <URL: http://www.dtic.mil/dtic/tr/fulltext/u2/a377272.pdf>. (Year: 2000).*

(Continued)

*Primary Examiner* — Eric T Oberly
(74) *Attorney, Agent, or Firm* — Mayer & Williams PC

(57) ABSTRACT

Systems and methods according to present principles provide a test architecture which is designed to support software and hardware testing in an automated environment. Systems and methods are described which include a functional definition and architecture of the test system including the host environment, host-user interface, test scripts, host-to-target communications, target test module, target test shell, target commands and other supporting aspects.

5 Claims, 4 Drawing Sheets

(56) References Cited

U.S. PATENT DOCUMENTS

| | | | | |
|---|---|---|---|---|
| 2006/0245427 A1* | 11/2006 | Austin | ............... | G06F 13/4291 |
| | | | | 370/389 |
| 2012/0066751 A1* | 3/2012 | Nutaro | ................. | G06F 21/606 |
| | | | | 726/7 |
| 2014/0107863 A1* | 4/2014 | Ishigooka | ............. | H04L 1/0009 |
| | | | | 701/1 |
| 2014/0344799 A1* | 11/2014 | Thodati | .................. | G06F 8/654 |
| | | | | 717/171 |

OTHER PUBLICATIONS

International Search Report and Written Opinion dated Feb. 17, 2017 issued in connection with corresponding International Application No. PCT/US16/61928 (7 pages total).

* cited by examiner

AVIONICS SYSTEM, ARCHITECTURE, AND METHOD

CROSS-REFERENCE TO RELATED APPLICATIONS

This application claims benefit of priority of the following U.S. Provisional Patent Application Ser. No. 62/255,010, entitled "System, Architecture, And Method For Testing Software And Hardware Components", filed Nov. 13, 2015; Ser. No. 62/254,983, entitled "System And Method For Common Approach Procedure", filed Nov. 13, 2015; and Ser. No. 62/254,959, entitled "System And Method For Coupling Existing Components", filed Nov. 13, 2015; all of which are incorporated by reference herein in their entirety.

FIELD

The invention relates to avionics systems.

BACKGROUND

FIG. 1 shows one example of an avionics system 100 that may be used in the operation of an aircraft. The system 100 includes a display device 102, a user input device 104, a processing system 106, a display system 108, a communications system 110, a navigation system 112, a flight management system (FMS) 114, one or more avionics systems 116, and a data storage element 118 that supports operation of the system 100.

The display system 108 generally represents the hardware, software, and/or firmware components configured to control the display and/or rendering of one or more navigational maps and/or other displays pertaining to operation of the aircraft and/or systems 110, 112, 114, 116 on the display device 102. In this regard, the display system 108 may access or include one or more databases suitably configured to support operations of the display system 108, such as, for example, a terrain database, an obstacle database, a navigational database, a geopolitical database, a terminal airspace database, a special use airspace database, or other information for rendering and/or displaying navigational maps and/or other content on the display device 102.

The processing system 106 includes or otherwise accesses data storage element 118, which contains aircraft procedure information (or instrument procedure information) for a plurality of airports and maintains the association of the aircraft procedure information and the corresponding airport. Aircraft procedure information includes a set of operating parameters or instructions associated with a particular aircraft action (e.g., approach, departure, arrival, climbing, and the like) that may be undertaken by the aircraft at or in the vicinity of a particular airport. For instance, the aircraft procedure information for a particular aircraft action may include graphic elements (e.g., symbols for navigational reference points, navigational segments, procedure turns, and the like) that graphically illustrate that aircraft action and textual information associated with the graphic elements that further describe the operating parameters or instructions for executing that aircraft action. For example, an instrument approach procedure (IAP) for an airport may include symbols and navigational segments that graphically illustrate the approach course along with procedure turns for transitioning to/from the approach course, and additionally, the approach procedure includes textual information associated with the symbols and/or navigational segments that describe the operating parameters or provide instructions for operating the aircraft at or in the vicinity of those symbols and/or navigational segments.

SUMMARY

In one aspect of the present disclosure, systems and methods according to present principles provide a test architecture which is designed to support software and hardware testing in an automated environment. Systems and methods are described which include a functional definition and architecture of the test system including the host environment, host-user interface, test scripts, host-to-target communications, target test module, target test shell, target commands and other supporting aspects.

In systems and methods according to present principles, the technician or programmer does not have to write special test code to enable testability of components. Rather, in one implementation, the programmer has only to make a declaration, or rather to change the way the declaration is made, e.g., in the declaration of various instrumental variables, i.e., "iVars", and in this way the software or hardware becomes testable or "settable" to the outside world. In so doing, testing components becomes more convenient.

In another aspect of systems and methods according to present principles, test software need not be loaded for testing, nor are special test "builds" required. The testing may occur on the actual software or hardware itself, which provides numerous benefits, particularly as such components, when used in avionics or other vehicle navigation or operational implementations, require significant levels of certification.

Advantages of the invention may include, in certain embodiments, one or more of the following. The test architecture may include a test environment supporting a high level of automation, repetition and inclusive testing of software and hardware, and the same may be advantageously employed in unit level and system level testing.

Other advantages will be understood from the description that follows, including the figures and claims.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

Testing of Hardware and Software Components

As will be described, a test architecture may provide a verification tool supporting software and hardware verification using automated testing methodologies. While this architecture is applicable to hardware and software components in general, in one illustrative application the test architecture offers testing of line replaceable units (LRUs) and complete avionics systems. The output of testing may include a test result record and log of the specific test inputs and test outputs to an archive-able file. A particular implementation is described below, but it will be understood that variations are possible.

Figure 1:
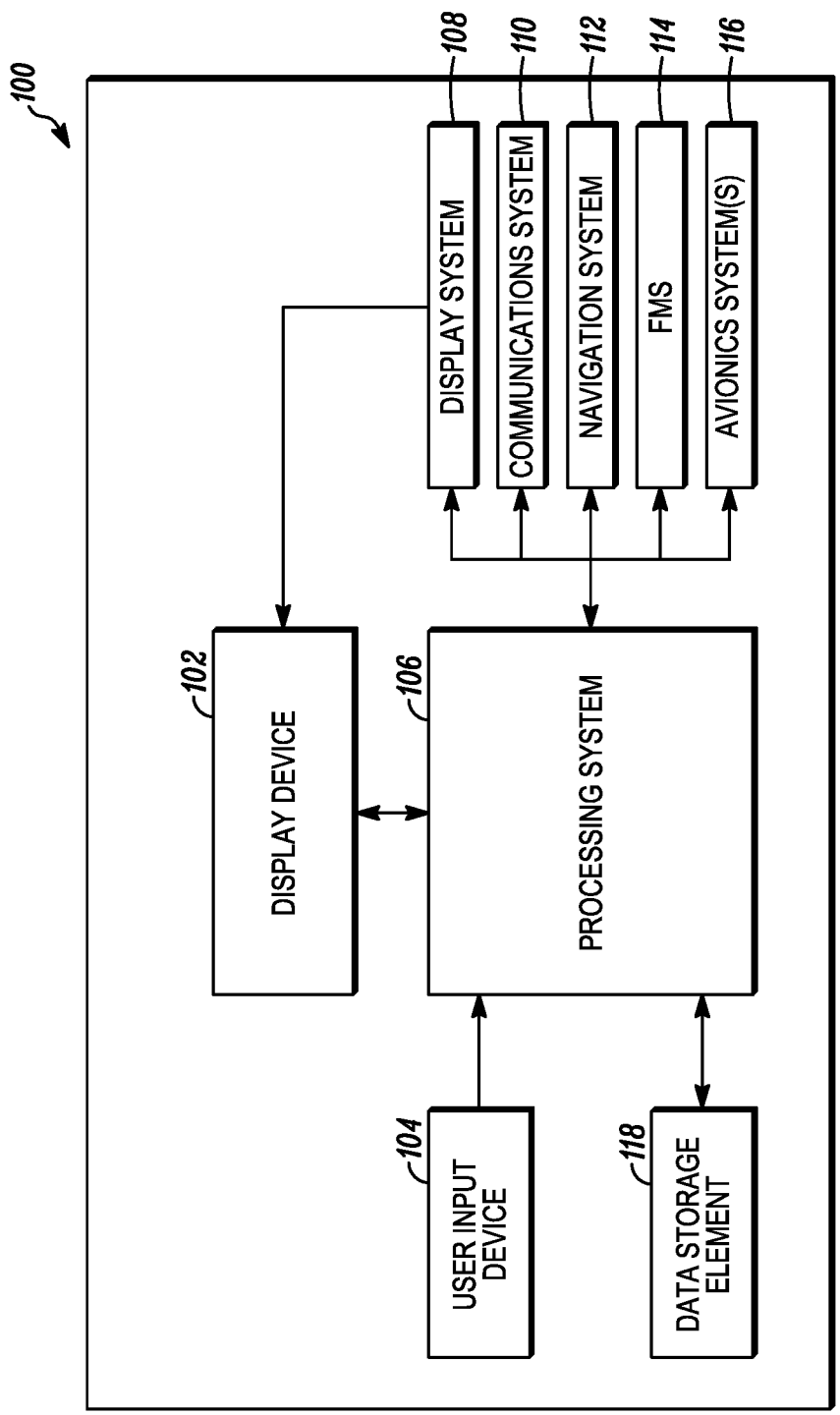
FIG. 1 shows one example of an avionics system 100 that may be used in the operation of an aircraft.
Figure 2:
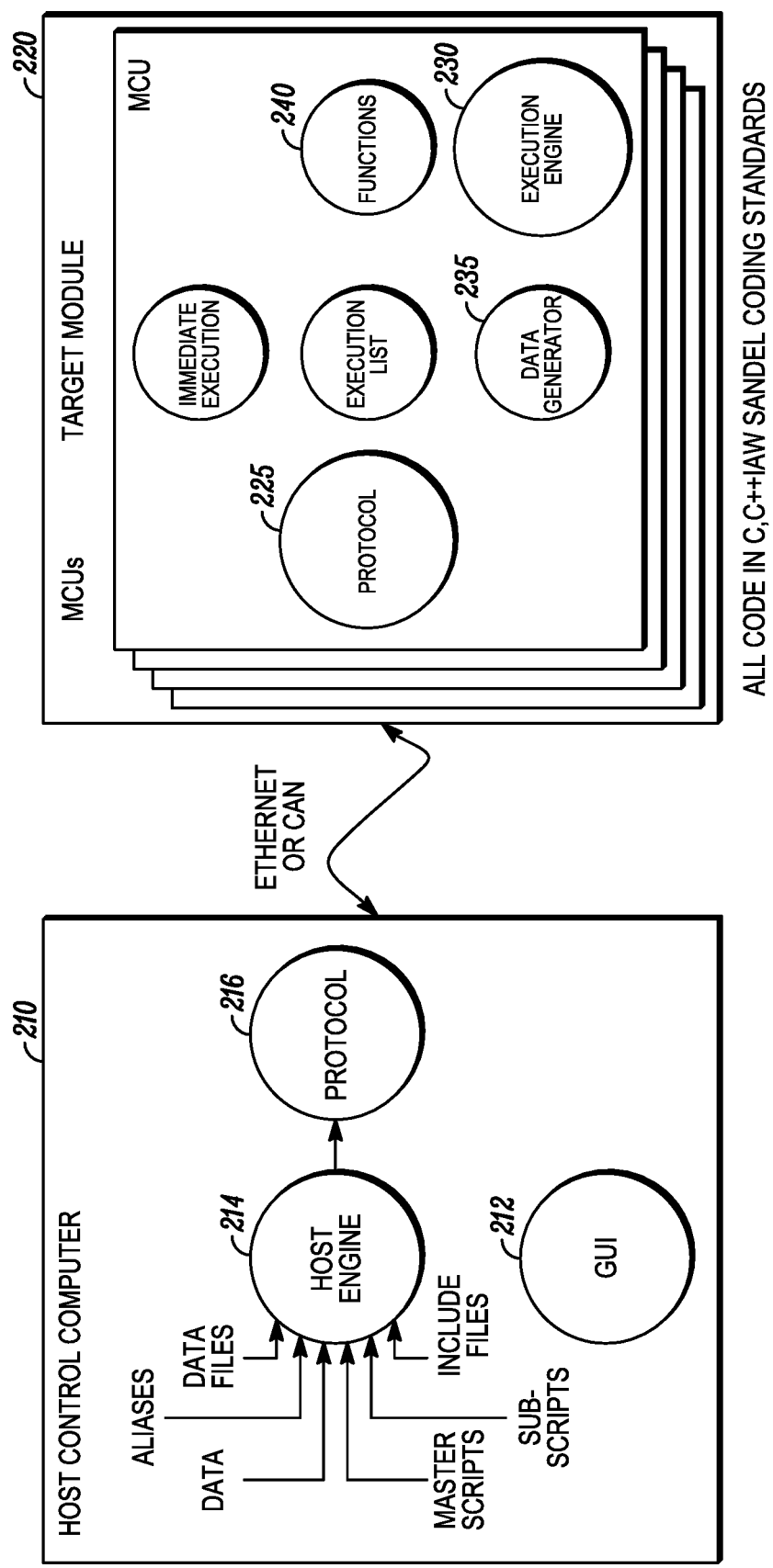
FIG. 2 shows a high level block diagram of an architecture that may be used to test hardware and software components.

As shown in FIG. 2, a host control computer 210 has a host engine 214 running the test environment that is used to control one or more target hardware components or modules 220. Each target component or module 220 includes one or more processors. For instance, in one embodiment, the target hardware components 220 may be line replaceable units (LRUs) that each include a processor such as a micro controller unit (MCU) as shown in FIG. 2. The MCUs or other processors each run embedded test software. The hardware component that is being tested and its associated processor will be from time to time referred to herein as the target module 220.

In the case of an avionics system undergoing testing, the various target modules may include avionics components and aircraft power components such as LRUs, Racks, Displays, PGP, AIU, AP Servo Controller and Aircraft Power Supply, including a power switch interface.

The host control computer 210 runs, for example, Python, LabVIEW or other scripting/control language and executes test scripts. The host control computer 210 executes scripting commands and communicates with the test module of the target system via, e.g., USB-to-controller area network (CAN) or CAN-over-Ethernet using a binary protocol 216. System scripts may be a series of LRU/MCU scripts combined into a single test, or may be additional tests intended for multi-LRU functions. Scripts are designed by the software author for Design Assurance Level (DAL C) or an independent test engineer (DAL A/B). LRU/MCU scripts are intended to be logically organized and stored with the target module source code.

The host control computer 210 can also run a Graphical User Interface (GUI) application 212, providing a user interface to functions often used for troubleshooting. The GUI may support one or more of the following features for the case where the target module is an LRU:
   Views of all LRUs connected
   For each LRU, the ability to change the mode to test mode, view iVars (instrumented Variables), set iVars
   Set Generators for an iVar
   Graph iVar data
   Create LRU/MCU
scripts In one embodiment the host control computer 210 may be, e.g., a PC compatible computer running Microsoft Windows configured with the test host environment. This environment includes the software and data required to conduct testing. Alternatively, the host control computer 210 may be a Linux CPU.

A test communications protocol 216 such as a binary protocol is used for communication between the host control computer 210 and the target module 220. The host control computer 210 physical interfaces may be USB, Ethernet, and PCIe. Adapters may be used for other target and equipment interfaces.

As previously mentioned, the target module 220 may be, by way of illustration, a complete avionics system under test or individual LRUs that each have a processor executing embedded software that is to be tested. As shown in FIG. 2, the embedded test software may include a protocol layer 225, execution engine 230, data generation functions 235, and instrumented variable access functions 240. Data used by scripts may be directly coded or may come from a data file. Data files may be generated from engineered data, recordings using an internal data recorder, test system recordings, external data generators, and target data generators.

The test architecture described herein supports expected results with the ability to compare expected results with target data to generate logged PASS/FAIL reports for a given test scenario. Expected results may be defined as specific values or acceptable statistical evaluation of the data.

As previously mentioned, the host control computer 210 supports communication to the targets modules 220 through, e.g., CAN via USB or Ethernet as required. The normal system would provide CAN data to an avionics instrumentation rack through Ethernet-to-CAN on a DATA I/O card. CAN can be directly supported for those situations where a DATA I/O card is not available.

The CAN interface from the host control computer 210 to the target module(s) may be used to communicate with the embedded test system. This may be a USB or PCIe device connected to the host control computer 210. An Ethernet interface from the host control computer 210 to the target module 220 via a hub or switch may be used to communicate with the target module.

Various interfaces devices that may be supported by the test architecture may include, by way of illustration, a serial interface from the host control computer 210 (USB to serial device is permitted) and a target LRU UART adapter, a uSD card adapter and class 10 uSD card, a test IO accessory, a power supply (12-28 v DC, 5 watts nominal), connection cables specific to target modules such as LRUs and/or Rack interfaces such as a mixed signal DIN, RJ45 patch, DB9 Null modem, DB9 CAN, test specific external data generation devices such as RF signal generators, GPS position generators, audio signal generators, aircraft servos, GPIB-USB Interface converter and a GPIB—Ethernet converter The host control computer 210 may also be able to operate external test equipment such as RF generators, power supplies, etc., through required interfaces.

The software supported by the host control computer 210 is a host environment that includes an integrated development environment which supports graphical script debugging, a script interpreter which has the capability to parse scripts and data files, acquire user input, and receive data from the target. The test architecture may be data driven. Exemplary types of data include: scripts, target specific translation tables, input data, expected outputs, target generated outputs and test results.

Scripts are defined as a collection of commands to be issued to a target module as well as elementary constructs of software programming such as arithmetic, logic and control flow operations for the script itself. The scripting language is to provide syntax, arithmetic, logic and control flow operations. Scripts are constructed using a defined library of methods which are supported by the target via the test communications protocol. Scripts may be hierarchical in that they may reference, or call, other scripts. Scripts may use a target specific alias to concatenated name translation tables to decouple script names from target names. Scripts are able to incorporate (read) input data to process and or communicate to the target during testing. Scripts are able to output captured data generated by the target during testing. Scripts are able to output test results based on comparisons of expected output data and output data generated by the target during a test.

The input data to the host control computer 210 is either predefined data in the test communications protocol, input data derived from external equipment or computed from a mathematical model or function with known inputs. Input data is used to simulate, access and control a target module being tested.

All data read from the target module may be saved in a format that can be used for data playback into the test system.

The expected outputs obtained by the host control computer 210 are predefined sets of data to be compared with target outputs during test execution. Expected results may be contained directly in the test script, or may be referenced as an external file by the test script. All test results, PASS/FAIL, will be saved with date & time stamps, test configuration, scripts executed and versions.

Figure 3:
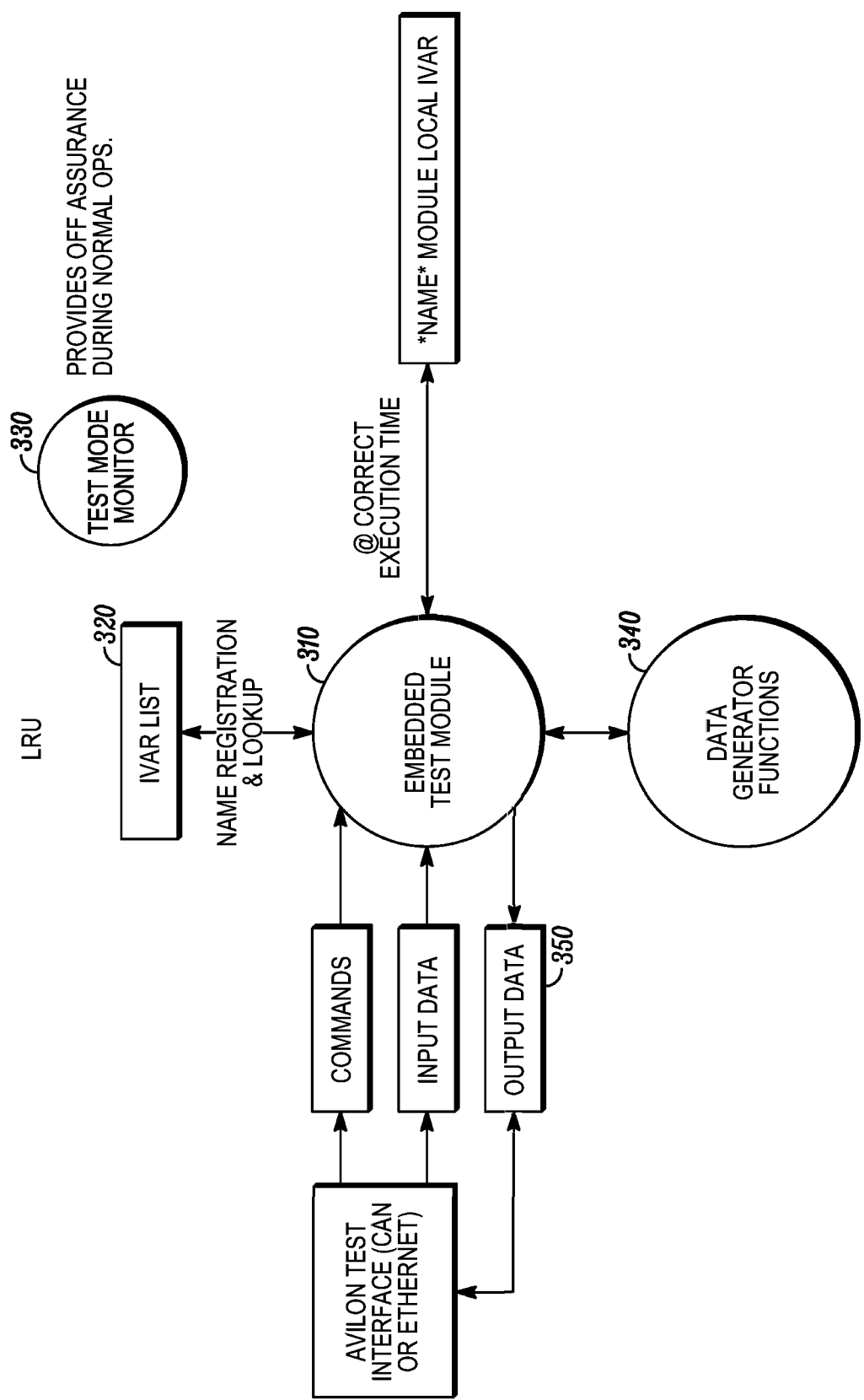
FIG. 3 shows a software data flow diagram of the embedded test software module that may be incorporated in the target module shown in FIG. 1.

If the target module is a component of an avionics system, then, as shown in FIG. 3, the target test software module 310 is a component of the avionics embedded software. The test module 310 provides the capabilities for injection and recording of data and commands 350 within the avionics embedded software. It generally may be included in the embedded software (i.e., it generally cannot be compiled out with compiler flags). It provides protocol handling of the avionics test communications protocol on all supported interfaces. The embedded test module 310 provides interfaces for other embedded modules to expose data elements known as iVars 320, as described in greater detail below, to the test system. The embedded test module 310 also provides a monitoring facility o ensure the integrity of data when test mode is NOT active.

A test mode monitor 330 controls access via the test interface. The mode defaults to disabled at startup. The target module may have test mode enabled via a specific command sequence which is provided via the test communications protocol from the Host control computer 210. To enter the test mode via the avionics test communications protocol, an target module-specific key may be required to avoid inadvertent entering of the test mode. For instance, a two-step process may be used to command an target module such as an LRU into test mode, e.g., arm followed by access type. Once the test system is enabled, variables may be accessed via handles acquired from the test interface. Upon target module reset, the test mode defaults to disabled and a new test session must be established.

The embedded test module 310 supports all commands defined in the avionics Script API, which will be described below.

The iVars are the primary data injection point for the embedded test software module 310 to modify data in the target module's system software. iVars are variables used in software which have added capabilities to be accessed via the embedded test software module 310. These variables are declared with an US-ascii text name which is used by test scripts to reference the variable by alias. iVars may contain a mode flag to control NORMAL program flow or TEST to disrupt normal program flow and allow the test system exclusive write access. When an iVar mode is NORMAL, the normal program and data flow is used for assignment. When an iVar mode is TEST, the normal program and data flow is blocked and only the test system assignments are used. Any data changes by the embedded software are ignored while a variable's mode is set to TEST. iVars are initialized with the mode set to NORMAL. iVars may be named with system unique concatenated names to be used for external access. Examples of concatenated name definition will be provided below.

The embedded test software module 310 supports internal data generator functions 340 for iVars which are configured from the host control computer via commands using the test communications protocol. An illustrative list of data generators and parameters will be presented below.

At startup, the target module is DISABLED. When a test mode is enabled, the test mode monitor 330 checks the mode flag. If an iVar mode flag is discovered in test mode, the error is communicated to the system. In one embodiment, the test mode monitor 330 executes at a frequency of at least 1 Hz.

The test communications protocol is used to communicate between the host control computer 210 and the target module's embedded test module 310. Little-endian bit order will be used on the protocol.

In the event that the test module is an avionics system, the protocol may support the following commands to the embedded test module 310:

| Command Name | Description |
| --- | --- |
| Get Test Mode | Get the mode of the MCU test system (Normal, read-only, read-write). |
| Arm Test Mode | Ready the test system for setting. The test system must be armed, and then set within 1 second of arming for the set to take effect. |
| Set Test Mode | Set the test mode |
| Get Test Info | Get the test info |
| Get IVar Mode | Get the iVar Mode -normal or test (writes controlled by test module). |
| Get iVar at Frequency | Get the iVar at a supplied sample rate |
| Get iVar at Time | Get the iVar at a future time (avionics time) |
| Get iVar Buffer | Get the buffer that the iVar points to (pointer type only). Size is passed. |
| Set iVar | Set the iVar to the value passed. |
| Set iVar at Time | Set the iVar to the value passed at a future time (avionics time) |
| Set iVar Buffer | Set the buffer to which the iVar points (pointer type iVar only) |
| Get iVar Generator | Get the status (enabled/disabled) and parameter of the iVar generator |
| Set iVar Generator | Set the iVar generator status (enabledgenerator) and parameters |
| Get System Time | Get avionics system time |
| Set System Time | Set the avionics system time |
| Get Error Log | Retrieve the errors logged in flash memory |

The functions defined for the test scripts to utilize corresponding commands supported by the embedded test software module 310 are described below. These functions are translated by the host control computer to the target module.

In the event that the target modules are LRUs, illustrative LRU functions that may be supported by the scripting are as follows:

| Function Name | Description |
| --- | --- |
| init_lru_read_write( ) | Set the mode of the LRU to test read/write mode, get the name of all of the iVars supported. |
| reset_lru( ) | Set the mode of the LRU out of test mode. All iVars will return to their normal mode. |

-continued

| Function Name | Description |
|---|---|
| reset_all inited LRUs( ) | Restore all LRUs that have been initialized by the script out of test mode. |
| setMode( ) | Set the mode of the LRU (Normal, Read only, read write) |
| getMode( ) | Get the mode of the LRU |
| getTestInfo( ) | Get the communications protocol version for the LRU and its name |
| setTime( ) | Set the LRU system Time |
| getTime( ) | Get the LRU System Time |
| getErrorRecords( ) | Get the stored error records for the LRU |

As previously mentioned, access to an iVar may be through the concatenated name. Concatenated names are generally unique throughout a system. A concatenation naming hierarchy is used. In one embodiment, concatenated names may be formed as follows:

| Field | Description | Range | Example |
|---|---|---|---|
| LRU NAME | Prepended | 6 characters | "VHFNAV" |
| LRU CHANNEL | Prepended | 0-3 | '2' |
| MODULE NAME | Prepended_file-name_(no suffix) | 7 characters | "VOR" |
| NAME | Test system name used to access the iVar | 7 characters | "freq" |

Allowed characters: (0-9, A-Z, a-z,). No other characters are permitted in any field. (i.e. space and '.') Non-permitted characters will be replaced with a '?'. The concatenated name may use '.' to separate the fields.

Below are illustrative iVar functions that may be supported by the scripting.

| Function Name | Description |
|---|---|
| iVar( ) | Constructor, and sets the mode to the value passed. |
| get_mode( ) | Get the iVar mode |
| set_mode( ) | Set the iVar mode |
| fetch( ) | Fetch the iVar value |
| set( ) | Set the iVar value |
| getBuffer( ) | Get the byte buffer of data to which this iVar points |
| setBuffer( ) | Set the byte buffer of data to which this iVar points |
| Set_generator( ) | Set the generator parameters of this iVar |
| get_generator( ) | Get the generator parameters of this iVar |
| Start_history( ) | Save all received values of this iVar in a list |
| Pause_history( ) | Stop saving all received values of this iVar in a list |
| Clear_history( ) | Reset the list of received values of this iVar |

It may sometimes be necessary to collect statistics on iVars values that are received. The following are the properties and functions of the iVar that may be used on the collected history of the iVar: Min, Max, Mean, Standard Deviation, Sorted history, Boolean if history is within a range, Boolean if degrees are within a range from the history, Number of values in history and Average rate of history.

iVars in scripts are objects that have a member variable "value" which represents the value on the target module. To make use of iVars like they are in the embedded system, several operators allow the iVar to be used like it is a value. For example, adding two iVars should create a value of the sum of the iVar values. The same applies to all standard mathematical functions.

For example:
Sum=iVar_1+iVar2
is equivalent to:
Sum=iVar_1.value+iVar2.value

Generators generate data setS to the iVar. Values are either set at a set rate, or in the case of loading data, at times provided. iVars can be set to generate a ramp function. The parameters for a ramp are as follows: Low Value, High Value, Time from low to high (sec), Time from high to low (sec) and Set frequency (Hz).

iVars can be set to generate a square wave with the following parameters: Low Value, High Value, Time at low (sec) and Time at high (sec).

Data can be streamed to the embedded test module. Two types of data that may be supported data at a fixed frequency and data with a time for setting each point.

To support automated formal verification testing a number of verification script functions are provided to provide pass/fail criteria and resultant test reports. The test script may report the results in a file that can include the following information: SVN version of the script, Summary Pass/Fail result. If one or more tests fail, the summary is FAIL, 1-n Test Functions, 1-n Jama IDs, 1-n Test IDs and Pass/Fail results. Every script can have 1-n Jama Test Cases supported, each with a description. Every Test case can have 1-n Test IDs. The result provides the pass/fail result of a specific test ID.

The test architecture may include a suite of test cases verifying the system in support of tool qualification for the Host/User Interface.

The following items may be logged by the host control computer: CAN communication to and from the host controller computer/embedded test module, communications from the engine web server broadcast to clients, iVar values received and Script Output Log files may include the date of the logging and the log type in the file name. Logged entries may also include the date and time.

In some embodiments the test architecture may support control of external test equipment from a script. External test equipment can be connected by a General Purpose Interface Bus (GPIB) or by a LAN. GPIB devices may use a LAN-GPIB converter or they may be addressed directly by the control language. Communication with external equipment may require either an IP address or an IP address of the LAN adapter, and a GPIB address. In order to enable scripts to run with differing configurations, the configuration can be set in a *.cfg file that describes the communications with the equipment.

Illustrative devices that may supported by the test architecture include: a Keithley 2015 THD Multimeter, an IFR 2948 Communication Service Monitor, an Agilent E3634A Power Supply a Laversab 6300 Pressure Generator and an Agilent E4438C ESG Vector Signal Generator. This list is not intended to be exhaustive and devices may be added to support future tests. In some implementations, these devices may support many commands but the test architecture will implement only those needed by the tests that are created.

An avionics system generally communicates board to board using CAN Bus messages in accordance with the Data-bus Protocol Specification and the Test Architecture Communications Protocol. These messages fit in the 8 byte CAN message structure and can be either direct (from one LRU to another), or broadcast to all LRUs. Assuming an avionics system is being tested, the host control computer is capable of sending and receiving specified CAN messages, either simulating another LRU, or listening to LRU communications. A script can send or receive a CAN message, setting its header according to the appropriate direct or broadcast specification, setting the data, and sending/snooping it. Sending can be at a given rate with data changes supported in-line.

Common Approach Procedure

Instrument approach procedures (IAPs) provide a series of predetermined maneuvers for an aircraft to perform from the beginning of an initial approach to a landing, and data for such procedures is defined by the FAA. Numerous types of IAPs exist, including precision approaches and non-precision approaches. Precision approaches include LPV approaches, while non-precision approaches include localizer only, circle to land, VOR, and all GPS approaches. The multiplicity of approaches leads to a multiplicity of skills for a pilot to learn, leading to opportunities for gaps in knowledge and mistakes to occur.

Figure 4:
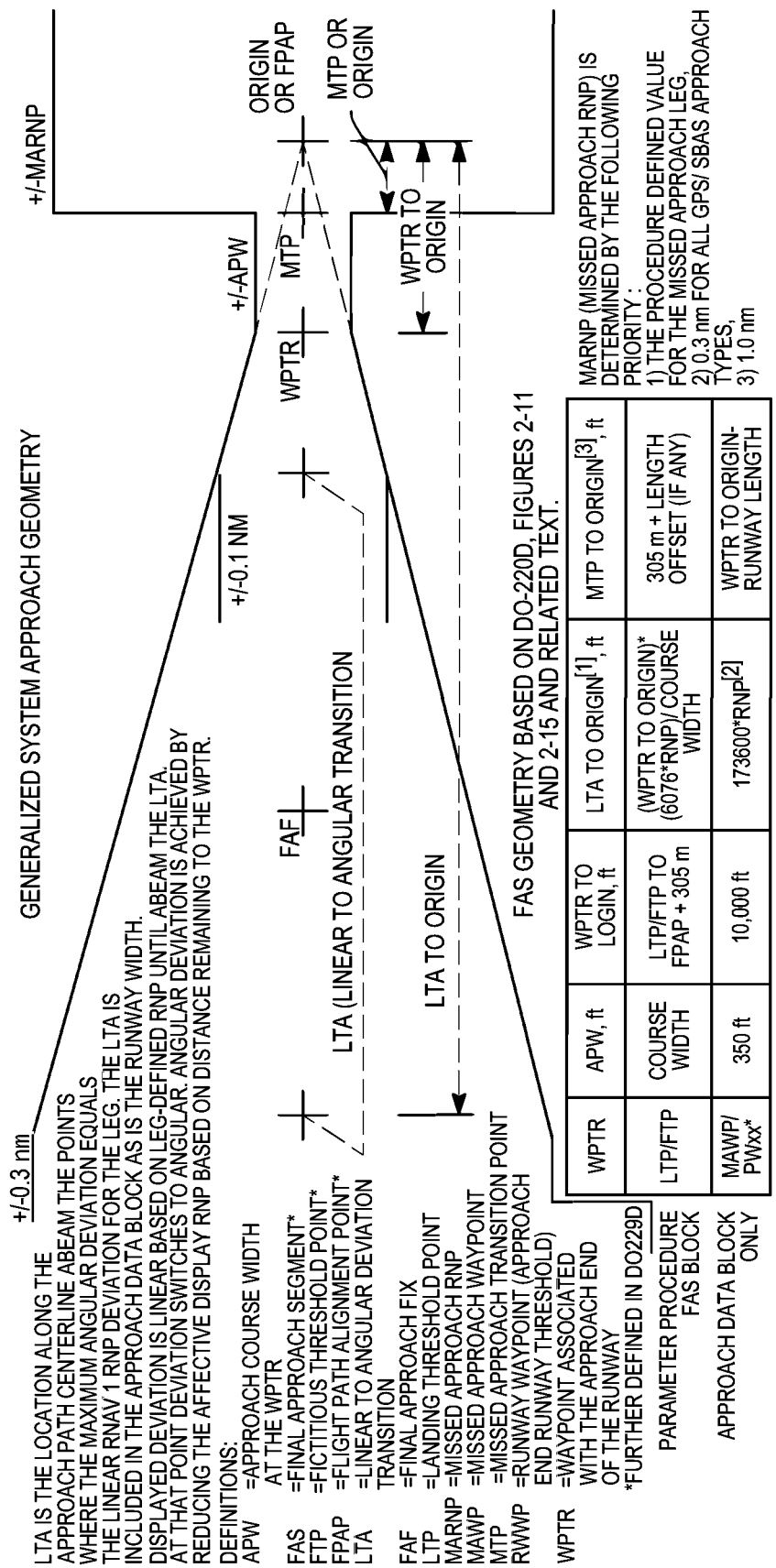
FIG. 4 illustrates a schematic diagram of a generalized or common approach procedure.

Referring in part to FIG. 4, systems and methods according to present principles treat all instrument approach procedures in a consistent manner, ensuring that a single set of pilot procedures can be used for conducting all types of approaches. So far as the pilot is concerned, all approaches operate and look like an ILS approach at all times. In other words, no matter what the source of the navigation is, the approach procedure generally looks the same, putting the pilot always in a better position to make the landing. This provides advantages as the pilot is only required to learn one method, not a multiplicity of methods. Following selection of the approach procedure, all approaches thus look the same to the pilot.

In systems and methods according to present principles, all approach procedures are defined by data contained in a navigation database contained in the system. The system can have many aspects besides configuring and calculating approach procedures, and the same generally relates to modular airborne avionics systems for monitoring aircraft airspeed, altitude, and navigation.

Such systems may include computer hardware, computer software, sensors, and avionics system interface devices which operate by means of a modular avionics architecture. In the system, the standard approach data defined by the FAA is augmented with supplemental information, depending on the approach type, such that the path, including transitions, is fully defined and appears consistent regardless of the selection of approach procedure performed by the pilot. This additional data is defined in greater detail below.

Selection of the approach type to be flown can be done at any time convenient for the pilot and can be changed quickly if airport or traffic conditions change. Except for the final approach segment of ILS approaches, all approach types may use GPS-WAAS navigation information. Where the approach type defines containment boundaries, those boundaries are honored. Where boundaries are not defined, systems and methods according to present principles may create boundaries that are consistent with the TERPS criteria under which the baseline procedure was developed. These boundaries created may be configured to be always well within the FAA terrain clearance guidelines and aerospace clearance guidelines.

Because the route corresponding to the procedure is fully defined laterally and vertically, there is no time-critical pilot mode switching required.

Once the procedure has been accepted, the lateral and vertical displays show the path as it is to be flown. If flight director or autopilot guidance has been selected, that guidance will follow the defined path using the appropriate navigation information.

On the final approach segment, angular deviation data may be displayed. The centerline of the approach procedure may be retained consistent with the published procedure. The leg types used to represent the procedure may be, e.g., track-to-fix and radius-to-fix. In more detail, on the final approach segment both ILS and LPV/LP approaches define deviation from the path centerline in angular terms. In the case of ILS this is a consequence of the signal transmitted from the ground. In the case of LPV/LP approaches the deviation is computed onboard the aircraft based on data supplied by a high integrity data block in the navigation procedure database. For all other approach types (NDB, VOR, VOR-DME, non-WAAS GPS, etc.), the navigation database in systems and methods according to present principles may contain a similarly defined high integrity data block, allowing the final approach deviations to be seen by the pilot as angular.

Information for the similarly defined FAS data block may be obtained from approach and airport information and may be tested for accuracy and integrity before the on-board data base is constructed. Once testing is complete the similarly defined FAS data block may be protected by a "CRC wrapper." Correctly decoding this wrapper within systems and methods according to present principles during the approach set up ensures that the data in the data block has not been compromised. CRC principles are also described below.

The transition from linear deviation information to angular deviation may occur at the distance from the runway where the linear deviation boundary (typically between 0.3 nm and 0.1 nm) is equal to the maximum angular deviation. In the case of ILS, displayed deviation data is actually switched when the transition occurs. For all other approaches, no switching is required. This is accomplished by changing the effective RNP boundary as a function of path distance from the runway.

For ILS approaches the navigation does switch from GPS to ILS. That switch is not dependent on pilot action and does provide pilot confirmation of the correct navigation source once the airplane is on the final segment and inside the final approach fix. Autopilot/flight director mode transitions may be initiated by the flight management system. Since that system also manages intercept paths, there is no concern about having to meet tight guidance engagement criteria. For ILS, the system may monitor the airplane performance along the approach path and may transition from GPS to ILS navigation data when the two sources most closely match. If a suitable lateral or vertical intercept path cannot be achieved, because of a delayed vector or excessive speed, for example, that fact will be visible immediately on the graphic display, giving the pilot time to request a new path to intercept the approach.

For all approaches except ILS there is no switching required because the path to the runway is continuously defined. As a consequence there are no pilot mode selections and no internal guidance mode selections.

The boundary lines for the angular segment of the final approach are depicted on the HSD and the VFD, giving the pilot a graphic image of the state of the approach and a clear picture of the trends.

The system may work equally well with straight in or curved lateral approach paths. This ensures compatibility with current approach types and requires no change to use RNP and advanced approach paths having curved segments that intercept the final straight segment outside or inside the final approach fix.

The system need not alter the published minima for the approach. The minima remains linked to the criteria upon which the published approach is based and to any additions applied by the pilot or the operator.

The approach lateral guidance for all approach types continues beyond the missed approach point to the missed approach holding fix. Go-around vertical guidance is available and automatically may transition to the missed approach holding altitude or the missed approach vertical path, if one is defined.

One benefit resulting from the described Common Approach Procedure (CAP) is simpler training, since only one set of steps needs to be learned to successfully fly all instrument approach procedures available to the navigation system. Flying any instrument approach provides practice in the skills necessary to conduct any other instrument approach procedure. Once the approach type is selected there are no further pilot selections required. This removes a significant opportunity for pilot error or confusion.

The use of high accuracy GPS information and the angular final segment of the approach increase the consistency of approach operations making sure the airplane is in a stabilized and consistent position from which to complete each approach when reaching minimums.

It is noted in this regard that some conventional instrument approach operations involve procedure turns or holding patterns in lieu of procedure turns. These are supported by systems and methods according to present principles. In an implementation within systems and methods according to present principles, however, the entry into those procedures is a defined path. This removes the need for pilot timing of the outbound leg and ensures that the path boundaries remain within the protected airspace for the procedure.

The lateral and vertical graphics provide a clear indication of the position of the airplane with respect to the desired path. The enhanced lateral and vertical trend information indicates at a glance whether the airplane is maintaining or departing from the path.

Selection of an approach type may lead to appropriate radios being tuned, and navigation information being selected, all based on the selected approach type. No manual entry is needed.

The basic objective for the Generalized Approach capability is to achieve a very high level of consistency for instrument approach operations regardless of the data source used to define the procedure. This capability relies on having high availability, accurate GPS information. The concept is an extension of the LPV capability introduced by the FAA several years ago. But now it is applied to more procedure types: RNAV, RNAV-RNP, VOR, VOR-DME, & NDB. The concept does not alter the published minimums for any approach and is constructed in a manner that guarantees the defined flight path will be fully compliant with the terrain and obstacle clearance criteria used to construct the basic instrument approach procedure (IAP).

To ensure that the path is fully defined, the IAP is redefined and tested before being added to the navigation database. The 3D path is continuous throughout and overlays the published procedure at all procedurally defined points. Procedure turns and holding patterns are fully defined as are the related entry and exit transitions from such procedures. The link between the final approach path and the missed approach is continuous ensuring that a defined lateral path will be available whenever the pilot initiates a go-around. The vertical missed approach path is also fully defined but does allow for pilot controlled vertical maneuvering during acceleration and cleanup.

The final approach segment deviation is angular while deviation along all other segments is linear. The linear deviation allowance for full scale is +/−0.3 nm unless the underlying procedure specifies a smaller value. The vertical deviation allowance for full scale is +/−75'.

While the vertical guidance on the final approach may be based on GPS information, the determination of minimums may be done using barometric altitude (MSL) only.

If a suitable FAS data block is defined for the specific runway served by the IAP, that data, with no change, is used for the Generalized Approach. If such a FAS data block does not exist, an Approach Data Block is created as described in the FIG. 4. If an approach data block has been defined, it is protected by its own unique CRC.

In more detail, multiple leg approaches using conventional navigation aids (VOR, ILS, or NDB) can have:
1. Inbound leg types
2. Outbound leg types
3. Heading legs with a timing requirement
4. Heading legs with a distance requirement Each of these leg types involves different operating procedures and may involve different reference instruments. All such procedures involve time critical actions by the pilot.

The generalized approach capability makes operation along all legs the same and removes all time critical pilot action requirements.

The IAP coded in the navigation data base is constructed exclusively of TF and RF legs and RF transitions between TF legs. The named waypoints in the IAP are used directly in the procedure. Additional system waypoints are defined for the RF legs and transitions. TF legs that link named waypoints are based on the 3D geometry of those points. Legs defined by a single point and an angle, such as a procedure turn, are constrained to remain within the protected airspace applicable to the leg. RF legs are defined with a radius appropriate to the speed category of the airplane (A, B, C or D) and the protected maneuvering space. Transitions are defined RF paths, and are fly-by unless defined as fly-over in the FAA published procedure.

In the case of ILS, the deviation data along with the autopilot or flight director steering will automatically switch from GPS-based information to ILS information at the procedure-defined linear to angular transition point (LTA in FIG. 4.) All other approach types continue to use GPS data along the final approach segment but transition to angular deviation at the LTA. The LTA distance is measured along the approach path from the Origin and will vary depending on the RNP defined for the procedure. Except for RNP, the information necessary to calculate the LTA distance is included in the FAS data block (DO-229D, Table D-1, page D-5) or the approach data block (see below). The RNP value is obtained from the onboard RNP calculation function. This allows limited pilot adjustment of the RNP for the purpose of training.

The LTA distance is measured along the approach path centerline and the deviation is computed normal to the approach path centerline at the airplane location. This permits the generalized approach capability to be compatible with straight-in approaches or curved approaches that intersect a short straight-in segment. For all approaches the segment between the waypoint closest to the approach end of the runway and the origin is a straight line.

Normally the origin is located along the extended runway centerline. For those circumstances where the published approach path is not coincident with the runway centerline, both the origin and the waypoint closest to the approach end of the runway are shifted laterally (in opposite directions) to ensure that, at minimums, the airplane will be in a position to successfully complete a visual alignment turn prior to landing.

The table at the bottom of the Generalized Approach Geometry figure relates the information in the published FAS data block with similar information in the approach data block.

Published GPS approaches with a FAS data block are permitted to be skewed a few degrees if necessary for terrain or obstacle clearance. The data block may support the same capability. It is generally best if the path rotation can be centered on the runway threshold. This enables a single turn to be made to align with the runway. This type of rotation may not be possible for VOR or NDB approaches where the path is aligned with the radio aid. In these cases the minimums will be high enough to make an "S" turn alignment procedure practical. In any case the final approach path must not be outside the published approach path by more than the transmitter angular alignment tolerance to ensure that obstacle and terrain clearance provisions of the original procedure are not violated.

Approach Data Block

The approach data block follows the form of the FAS data block as defined in DO-229D, Appendix D with the following exceptions.

Operation Type: All approach procedures using an approach data block are considered straight-in (type 0) (even if they are angled with respect to the runway centerline) followed by a missed approach except RNAV-RNP procedures which can be straight-in (type 0) or curved (type 3) followed by a missed approach.

Route Indicator: All approach procedures using an approach data block are assumed to have a single path to the runway, therefore this field is not used.

Reference Path Identifier: This is the "AL" number for the published approach procedure upon which the procedure is based.

MAWP/RWWP/Threshold Latitude: represents the latitude of the named missed approach waypoint or runway waypoint or runway landing threshold in WGS-84 coordinates and encoded in arc seconds. Use the same sense as for the FAS data block.

MAWP/RWWP/Threshold Longitude: represents the longitude of the named missed approach waypoint or runway waypoint or runway landing threshold in WGS-84 coordinates and encoded in arc seconds. Use the same sense as for the FAS data block.

MAWP/RWWP/Threshold Height Above Ellipsoid: represents the WGS-84 height of the MAWP/RWWP/Threshold point. This field is coded as an unsigned value with an offset of −512 m. A value of zero in this field places the reference point 512 m below the earth ellipsoid.

ΔOrigin Point Latitude: represents the difference in latitude of the Origin Point from the MAWP/RWWP/Threshold, defined in WGS-84 coordinates and encoded in arc seconds. Use the same sense as for the FAS data block.

ΔOrigin Point Longitude: represents the difference in longitude of the Origin Point from the MAWP/RWWP/Threshold, defined in WGS-84 coordinates and encoded in arc seconds. Use the same sense as for the FAS data block.

Approach Threshold Crossing Height (TCH): The height of the FAS path above the landing threshold point defined in either feet or meters as indicated by the Approach TCH Units Selector.

Course Width at Threshold: The lateral displacement from the path defined by the FAS at the MAWP/RWWP/Threshold point at which full-scale deflection of a course deviation indicator is attained. The field is coded as an unsigned fixed-point number with an offset of 80 meters. This will normally be set to ~26 m, yielding a course width of 350 feet.

ΔLength Offset: This field is not used.

| Data content | Bits used | Range of values | Resolution |
|---|---|---|---|
| Operation type | 4 | 0 to 15 | 1 |
| SBAS provider ID | 4 | 0 to 15 | 1 |
| Airport ID | 32 | — | — |
| Runway number (Note 1) | 6 | 1 to 36 | 1 |
| Runway letter | 2 | — | — |
| Approach performance designator | 3 | 0 to 7 | 1 |
| Route indicator | 5 | — | — |
| Reference path data selector | 8 | 0 to 48 | 1 |
| Reference path identifier | 32 | — | — |
| MAWP/RWWP/Threshold latitude | 32 | +/−90° | 0.0005 arcsec |
| MAWP/RWWP/Threshold longitude | 32 | +/−180° | 0.0005 arcsec |

Note 1:
Runway number 00 is reserved for helicopter operation.

Approach Data Block Testing

Before being distributed in the navigation database, each approach procedure that includes an Approach Data Block may be tested by flying the procedure using a simulated system and the certified TAWS. From each IAF, the procedure may provide a continuous path to the missed approach point. Guidance along that path may position the aircraft at the lowest published minimums in a position from which a landing could be made without unusual skill and without any TAWS alert having occurred.

At least one missed approach may be executed for each procedure that includes an Approach Data Block. The vertical component of the missed approach procedure may be programmed to operate in a manner representative of a pilot with ordinary skill. The lateral portion of the missed approach may be flown as for the approach. The missed approach lateral path may be continuous from the approach procedure. Lateral guidance may have no gaps or discontinuities and may result in the airplane reaching the missed approach holding point without any TAWS alert having occurred.

Coupling Existing Components

Systems and methods according to present principles relate to modular airborne avionics systems (modular suite devices) for monitoring aircraft airspeed, altitude, and navigation, and the same may include computer hardware, computer software, sensors, and avionics system interface devices which operate by means of a modular avionics architecture. The systems and methods further relate to such avionics components that are convenient to install and to interface with existing instrumentation. In one implementation, such components may be installed as OEM components, while in other implementations, the same may relate to retrofit installations.

In more detail, previous designs required separate wiring for most of the signal connections between the avionics system and other equipment on the airplane and required separate data buses for information of different design assurance levels. The result was a time consuming and error-prone airplane wiring effort for every installation.

In present systems and methods, when a new modular suite device is installed, particularly one that substitutes for several components, and thus provides a suite of functionality, existing connectors may be employed. In other words, if the existing system is connected to an instrument, the existing connector may be moved over to a new central box, eliminating the need for rewiring and problems attendant thereto. The new central box may occupy the same space, so there is no need to extend the wires.

One or more factors may be employed to enable the use of a single data bus accessing multiple components, rather than having a separate data bus for each group of components, or rather a separate data bus for each group of components that are associated with a particular design assurance level, as is done in most current aircraft. Thus, systems and methods according to present principles may in one arrangement include: 1) a data bus structure that allows multiple data buses carrying data of different design assurance levels to be routed in a single cable, 2) the existence of multiple processors in most of the line replaceable units (LRUs) enabling different design assurance level information to be processed in each LRU, and 3) the use of existing connectors for interfacing with airframe and engine sensors and instrumentation.

In more detail, systems and methods according to present principles are directed to ways in which data of different design assurance levels may be transmitted or mixed on the same data bus.

In particular, "design assurance level" or "design criticality" are terms related to data that has different levels of criticality with regard to safety. For example, pitch and roll data are safety critical, while data about a passenger reading light is much less so. Nevertheless, both types of data may appear on a data bus if just one bus or only a few buses are used. These datatypes may range from design assurance level "A", for the most important data, to design assurance level "D", for the least important data. While systems and methods according to present principles do not exclude the use of multiple data buses, they enable multiple types of data to be carried and mixed on a single bus.

In more detail, when multiple types of data are sent by messages using a single bus, problems can arise. For example, an avionics component having a low design assurance level may, by an error of programming, start transmitting messages that should be associated with a high design assurance level. In this case, the recipients of such messages are not aware that the data is being sourced from a low design assurance level device, and may inadvertently use such data in calculations and displays, even though such may be significantly faulty. Clearly it is undesirable for a lower design assurance level device to corrupt higher design assurance level devices.

Thus, systems and methods according to present principles incorporate the inclusion of a check value, e.g., a short cyclic redundancy check (CRC), with each message, i.e., each data transmission. That is, the software that produces the messages to be transmitted further generates a separate CRC for each message. A separate and different CRC may be employed for each different data assurance level. For example, design assurance level "A" data may use a level "A" CRC, and so on. The integrity of the system may then be assured by ensuring that the device or software that produces the CRC for one level cannot produce this CRC for a different level. Such may be enforced by an appropriate rules-based system. Thus, in this way, data may be mixed on the data bus without having to physically segregate data having different design assurance levels, because the data itself has the design assurance level built-in.

In use, every message "consumed" by a particular device has its validity or integrity checked by use of the check value, e.g., a CRC, before it is allowed to be used by the device.

An advantage of such systems is that processing can be distributed over multiple devices, thus avoiding the issue of a single point of failure. However, in providing such a distributed system, data from one device can contaminate data from another device. By use of the CRC on transmitted messages, as described above, this disadvantage is overcome.

Another aspect of such systems concern configuration control. Configuration control is related to control of systems having multiple devices or processor-based systems on a data bus. For example, in the avionics system described, certain implementations and arrangements may include 25 or more processors coupled to the bus. Software load among different components becomes an important yet complicated issue in such systems. Thus, to address this, and to allow certification of which configurations work appropriately and which do not, systems and methods according to present principles provide a software compatibility code for each message that is used by the system. In other words, each message, when it transmits, has a design assurance level CRC as described above. But it also incorporates, particularly at system initialization, a software compatibility code that is transmitted to one or more units, so that each device is aware of its software compatibility with neighboring LRUs, and it can then check its list to ensure that software with which each device is interoperating is certified for interoperability. Information about the interoperability may be transmitted by way of messages.

The systems and methods according to present principles may require separate electrical power wiring for each function that has a separate circuit breaker. These connections may be facilitated with pre-built cables already attached at the modular suite device end and may be ready to be attached to the appropriate circuit breaker. All other power connections within the modular suite device may be carried in the pre-installed cables. All antennae cables and the few remaining signal wires may be pre-installed at the modular suite device end. The airplane original main instrument panel may be replaced by a new panel with all necessary modular suite device display, rack, and engine interface unit mounting hardware pre-installed. The entire modular suite device system, all LRUs, cables, panels and brackets, maybe shipped as a pre-tested kit. This greatly reduces the chance of a wiring error during installation with the attendant troubleshooting time and damage exposure.

The systems and methods described herein may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, are loaded into random access memory. Inputs to the application, e.g., from the plurality of users or from any one user, may be by any number of appropriate computer input devices. For example, users may employ a keyboard, mouse, touchscreen, joystick, trackpad, other pointing device, or any other such computer input device to input data relevant to the calculations. Data may also be input by way of an inserted memory chip, hard drive, flash drives, flash memory, optical media, magnetic media, or any other type of file—storing medium. The outputs may be delivered to a user by way of a video graphics card or integrated graphics chipset coupled to a display that maybe seen by a user. Alternatively, a printer may be employed to output hard copies of the results. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., personal computers, laptop computers, notebook computers, net book computers, handheld computers, personal digital assistants, mobile phones, smart phones, tablet computers, and also on devices specifically designed for these purpose. In one implementation, a user of a smart phone or wi-fi— connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method. In the below system where a test architecture is contemplated, the plural inputs may allow plural users to input relevant data at the same time.

What is claimed is:

1. A method for arranging data communications between multiple devices using a common data bus, the multiple devices incorporating at least two different design assurance levels, comprising:
   a. configuring a first processor-based device for signal communications of messages using a data bus;
   b. configuring a second processor-based device for signal communications of messages using the data bus;
   c. configuring the first processor-based device to transmit messages to the second processor-based device, the configuring to transmit messages further including generating a check value according to a design assurance level associated with the second processor-based device, the design assurance level selected from a plurality of design assurance levels and associated with a design criticality of the second processor-based device; and
   d. on the second processor-based device, validating the check value according to the design assurance level of the second processor-based device prior to using the data in the message for display or calculations,
   e. such that if the transmitted message is received by a third processor-based device, the third processor-based device having a design assurance level different from that of the second processor-based device, then the third processor-based device is configured to not be able to use data in the transmitted message, the configured to not be able to use data based on that the third processor-based device is configured to check a validity of the message transmitted using the check value, and the check value is generated according to a design assurance level associated with the second processor-based device, and the design assurance level of the second processor-based device is different from that of the third processor-based device, and the third processor-based device is configured to fail messages received if their check value is generated according to a design assurance level different from its own, such that the third processor-based device is configured to not be able to use data in the transmitted message.

2. The method of claim 1, wherein the check value is a cyclic redundancy check (CRC) value.

3. The method of claim 1, further comprising providing a different design assurance level parameter for each different design assurance level.

4. The method of claim 1, wherein the generating a check value is further based on a design assurance level associated with the first processor-based device.

5. The method of claim 1, wherein the first and second processor-based devices are further configured to, upon initialization of the system, transmit software compatibility messages to each other and/or to other connected processor-based devices, the software compatibility messages indicating software compatibility between the different devices, the software compatibility messages received being stored in a list such that each device is aware of what software or software configurations the device enjoys interoperability with, each device being configured to check the list for interoperability at least once prior to interoperating with other devices in the system.

* * * * *